Figure 1:
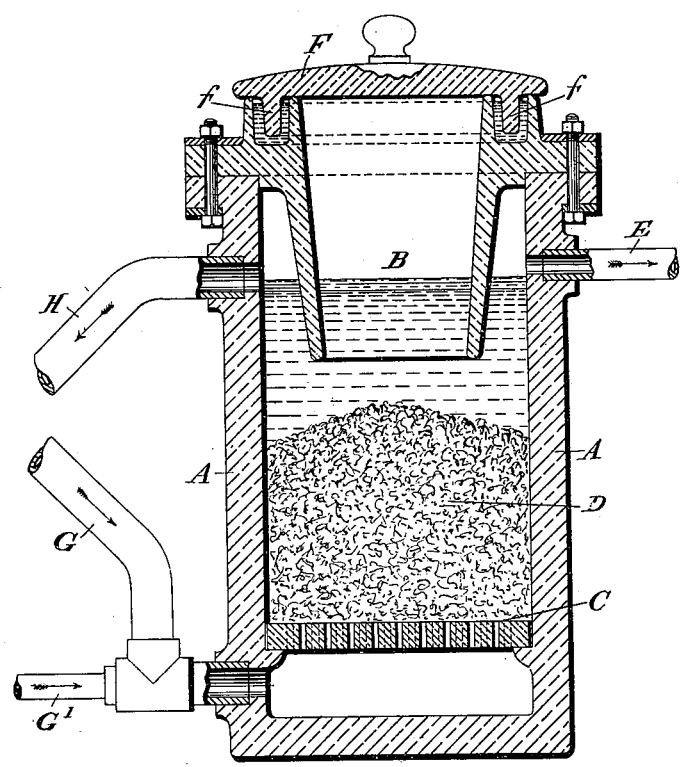

No. 652,846. Patented July 3, 1900.
J. HARGREAVES.
PROCESS OF PURIFYING AND STRENGTHENING BRINE FOR USE IN ELECTROLYTIC CELLS.
(Application filed Aug. 29, 1898.)

(No Model.) 2 Sheets—Sheet 1.

Witnesses:
Joseph Parker Owen.
Thomas Lewis.

Inventor:
James Hargreaves,

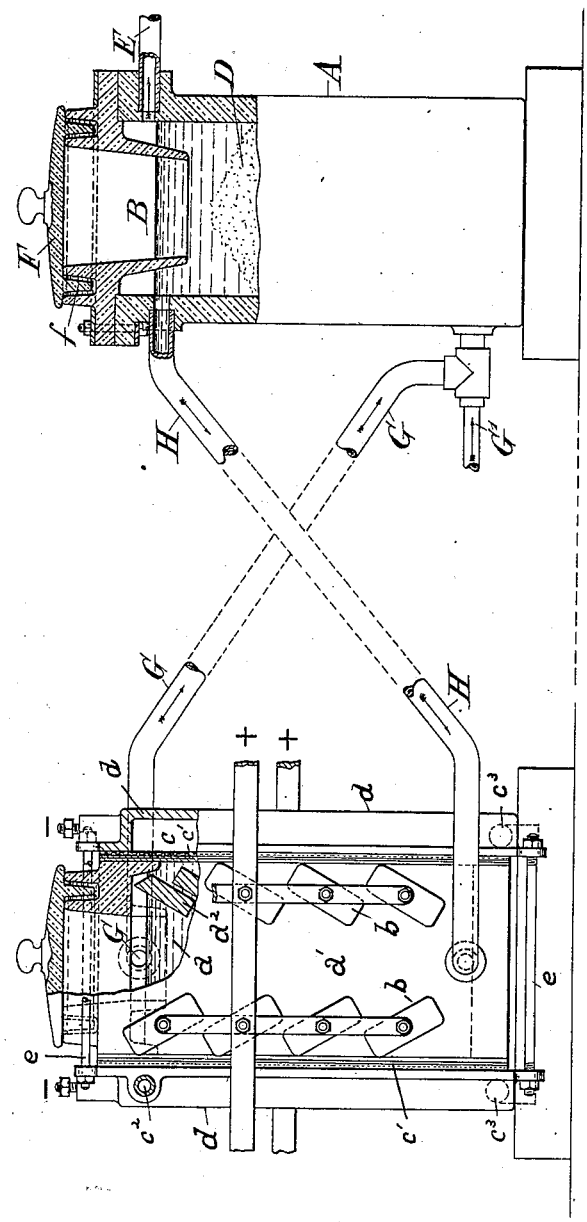

UNITED STATES PATENT OFFICE.

JAMES HARGREAVES, OF FARNWORTH-IN-WIDNES, ENGLAND.

PROCESS OF PURIFYING AND STRENGTHENING BRINE FOR USE IN ELECTROLYTIC CELLS.

SPECIFICATION forming part of Letters Patent No. 652,846, dated July 3, 1900.

Original application filed February 12, 1898, Serial No. 670,101. Divided and this application filed August 29, 1898. Serial No. 689,790. (No specimens.)

*To all whom it may concern:*

Be it known that I, JAMES HARGREAVES, a subject of the Queen of Great Britain and Ireland, residing at Farnworth-in-Widnes, in the county of Lancaster, England, have invented a certain new and useful Process for Purifying and Strengthening Brine Solution for Use in Electrolytic Cells, (for which I have applied for a patent in Great Britain, No. 17,161, to bear date July 20, 1897,) of which the following is a specification.

This invention relates to a process for separating soluble from insoluble matter for strengthening weakened brine solution from electrolytic cells and for rendering such strengthened brine capable of reuse principally, though not exclusively, with the cells described in the specification to my application, Serial No. 670,101, filed February 12, 1898, and whereof my present application is a division.

The salt liquor from electrolytic cells sometimes contains a quantity of insoluble matter, and for economical reasons it becomes necessary to treat the liquid for effecting the settlement of the insoluble impurities and to render the liquid serviceable in the electrolytic cells.

In carrying out my invention I employ a vessel of suitable capacity, into which the liquid from the electrolytic cells is conducted by means of pipes, which may be of vulcanite or other suitable non-conducting material, the liquid being caused to percolate upward through a quantity of impure salt contained in said vessel, whereby said liquid becomes saturated with brine and the insoluble impurities are caused to settle or are intercepted, the liquid being led away for reuse in electrolytic cells. The object of passing the brine upward is to insure the fine salt being first dissolved. If passed through in the ordinary manner of lixiviating—*i. e.,* downward—the grid or false bottom would soon become choked and impermeable. Another advantage is that any mud is caught by the upper mass of crystals and the brine comes away clear, whereas by the old method of lixiviation the dirt is carried forward to the electrolytic cell.

In the accompanying drawings, Figure 1 represents a vertical section of a "saturating" or intercepting vessel constructed according to my improved method and adapted for employment with electrolytic cells when treating impure salt or brine. Fig. 2 shows in elevation and partial section a cell and a saturating vessel illustrating my improved method of working.

The saturating vessel comprises an earthware receptacle A, provided with a feeding-orifice B. Near the lower end of this receptacle is an earthenware grid C, whereon the impure salt D rests, the same being charged through the orifice B.

E is the outlet for any chlorin which may be present in the vessel.

F is a cover whereof the depending flange $f$ dips into a water seal.

The weakened liquor from the electrolytic cell enters the saturating vessel by way of the pipe G and is injected into said vessel by means of a steam-jet G', while the saturated solution flows from the said vessel A by way of the pipe H to the anode-compartment of the electrolytic cell.

The electrolytic cell (illustrated in Fig. 2) comprises an anode-compartment $a$, formed by coating one side of each of a pair of lead plates $a'$ with pitch, the walls being formed by casting cement against the said pitched sides. The anodes $a^2$ are inserted through perforations in said walls and plates in such a manner that they form a kind of grid against which the salt to be decomposed rests, the extremities of the anodes being inclosed in caps $b$, of lead or type-metal. The cathode-compartments $c\ c$ are formed by the cast-metal trays or plates $d\ d$, a combined diaphragm-electrode $c'\ c'$ being inserted between the anode and each cathode compartment. The cell is then secured together by means of bolts $e\ e$.

H is the inlet-pipe for strong brine from the saturating vessel A, and G is the outlet-pipe for the weakened brine which passes into the said saturating vessel.

$c^2$ is the inlet for steam to the cathode-compartment for the purpose of effecting the dislodgment of the alkali from the surface of the cathode, $c^3$ being the outlet for said product.

By the employment of the herein-described saturating-vessel in conjunction with electrolytic cells for the decomposition of salts such as herein referred to any insoluble impurities which may be present in the solution after treatment in the cell may be intercepted before allowing the solution to pass into the cells for retreatment.

The pipes employed for connecting the cells with the vessel and for conveying the strengthened brine from the latter may be constructed of vulcanite or other suitable non-conducting material.

What I claim as my invention, and desire to secure by Letters Patent, is—

In the electrolysis of salts, the herein-described process for separating soluble from insoluble matter for strengthening weakened brine solution from electrolytic cells and for conducting the strengthened brine to the electrolytic cells, consisting in conducting the weakened brine from the electrolytic cells, forcing same upward directly through and in intimate contact with a mass of impure salt contained in a sealed vessel by means of a steam-jet, and then conducting the strengthened brine solution from the upper end of the said vessel back to the electrolytic cells.

JAMES HARGREAVES.

Witnesses:
JOSEPH PARKER OWEN,
THOMAS LEWIS.